ations have heretofore been proposed. Phenoxy-type herbicides, especially, 2,4-dichlorophenoxy-acetic acid (hereinafter "2,4-D") and 2-methyl-4-chlorophenoxyacetic acid (hereinafter "MCP"), their esters and salts, have been preferably used as herbicides, because they are effective against broad-leaved weeds and grasses such as *Eleocharis acicularis*, *Cyperus serotinus*, *Alisma canaliculatum*, and the like, because they have a systemic effect, and because they have relatively low toxicity to mammals. The 2,4-D and MCP type herbicides have certain disadvantages, however. For example, these herbicides cannot control the growth of the objectionable weeds of the family Gramineae, such as *Echinochloa crus-galli* (commonly known as barnyard grass). They affect the culture of vegetables and fruit trees. Furthermore, they cause chemical injury to rice plants, depending on the time of application and the dosage.

United States Patent

Kimura et al.

[19]

[11] 3,929,452

[45] Dec. 30, 1975

[54] HERBICIDAL COMPOSITION

[75] Inventors: Ichiro Kimura, Shuzuoka; Hironari Sugiyama; Kiyoshi Takita, both of Shimizu; Makoto Mizutani, Oyama, all of Japan

[73] Assignee: Kumiai Chemical Industry, Japan

[22] Filed: July 26, 1974

[21] Appl. No.: 492,273

Related U.S. Application Data

[63] Continuation-in-part of Ser. No. 128,134, March 25, 1971, abandoned, and a continuation-in-part of Ser. No. 117,711, Feb. 22, 1971, abandoned.

[52] U.S. Cl. ................... 71/100; 71/109; 71/110; 71/116; 71/117; 71/DIG. 1
[51] Int. Cl.² ........................................... A01N 9/12
[58] Field of Search ............................ 71/100, 117

[56] References Cited
UNITED STATES PATENTS
3,679,726    7/1972    Kudamatsu ..................... 71/100

*Primary Examiner*—Glennon H. Hollrah
*Attorney, Agent, or Firm*—Oblon, Fisher, Spivak, McClelland & Maier

[57] ABSTRACT

Herbicidal compositions comprising mixtures of S-(monochloro-, dichloro- or methylbenzyl)-N,N-dialkylthiocarbamate and 2,4-dichlorophenoxyacetic acid or 2-methyl-4-chlorophenoxyacetic acid or esters or salts thereof have remarkable selectivity for controlling the growth of weeds and do less chemical injury to farm products, especially rice seedlings.

10 Claims, No Drawings

HERBICIDAL COMPOSITION

CROSS REFERENCE TO RELATED APPLICATIONS

This application is a continuation-in-part of copending application Ser. No. 128,134, filed Mar. 25, 1971 now abandoned, and a continuation-in-part of application Ser. No. 117,711, filed Feb. 22, 1971, now abandoned.

BACKGROUND OF THE INVENTION

1. Field of the Invention:

This invention relates to a herbicidal composition. More particularly, this invention relates to a herbicidal composition which is effective against annual weeds and Slender or Needle spikerush; (*Eleocharis acicularis* ROEM et SCHULT.) in paddy fields and against upland weeds in dry fields, without doing chemical injury.

2. Description of the Prior Art:

It is difficult to determine the best time for applying a herbicide, since most weeds in a rice paddy field will develop between the germination of the paddy seeds and 2 weeks after rice-transplantation. Most conventional herbicides are effective in the initial period of weed germination. However, they are less effective during the growth of the weeds. It is usually difficult to provide sufficient herbicidal effects if conventional herbicides are applied after 10 days following rice-transplantation, and even if the herbicide is applied in the initial period following rice-transplantation, it is difficult to control the growth of those weeds which germinate after the 10-day period.

Accordingly, the best time to apply a herbicide to a rice paddy field seems to be after all of the weeds have germinated. However, heretofore, no suitable herbicide has been found which can satisfactorily be used during this time period and accordingly a need exists for a weed growth controlling herbicide which can control the growth of the weeds over relatively long periods of time from the initial period of germination to the growth period.

Thiocarbamates have been found to be remarkably effective for inhibiting Slender or Needle spikerush, and favorable results are obtainable when it is used in amounts of greater than 250 grams per 10 Ares, if it is applied during the initial period of germination. However, the thiocarbamates are less effective against annual weeds, and against broad-leaved weeds.

2, 4-Dichlorophenoxyacetate, 2-methyl-4-chlorophenoxyacetate, a simulative plant hormone, can be absorbed by the roots, stalk and leaves, or by certain other parts of the plant, and is capable of providing a herbicidal effect. It has been found that when the stalk and leaves of the partially developed weeds are sprayed with 100 to 1,000 ppm of 2, 4-dichlorophenoxyacetate, the weeds were destroyed after one week. Moreover, when 50 grams of 2, 4-dichlorophenoxyacetate per 10 Ares are applied to a dry field prior to weed germination, the growth of the weeds can be completely inhibited.

It is possible to control weeds by applying these two types of processes. However, the simulative plant hormone will provide a very strong effect against broad-leaved weeds, but only a weak effect against paddy weeds. Moreover, some degree of growth injury to rice plants have been found when the simulative plant hormone was applied after 3 to 5 days following rice-transplantation. These growth injuries may be caused by the absorption of the ingredient by the roots of the rice, since the mobility of the ingredient in the soil is usually about 4 to 5 cm. It is also especially dangerous to apply the plant hormone to a water soaked field, shallow planted plants or paddy seedlings which require a significant amount of time for taking root after transplantation.

The need exists therefore, for a composition characterized by reduced chemical injury to the desirable plants, yet high herbicidal effect for a broad range of undesirable weeds. A need also exists for a high herbicidal effect composition which can be applied at any time during the weed germination and growth period.

SUMMARY OF THE INVENTION

Accordingly, it is one object of this invention to provide a herbicidal composition which is effective against weeds over long periods of time, such as from the initial period of germination to the growth period.

It is another object of this invention to provide a herbicidal composition which is effective for the control of weeds over long periods of time even after a single application.

A still further object of this invention is to provide a herbicidal composition which will inhibit weed growth in wet lands, such as rice paddies and the like, yet which is harmless to the agricultural product.

These and other objects have now herein been attained by providing a composition containing a simulative plant hormone in combination with a thiocarbamate. In particular, these objects have been attained by the combination of S-(monochloro, dichloro- or methylbenzyl)-N, N-dialkylthiocarbamate and 2, 4-dichlorophenoxy acetic acid (2,4-D), 2-methyl-4-chlorophenoxyacetic acid (MCP), or the ester or salt thereof, as the active ingredients.

DETAILED DESCRIPTION OF THE PREFERRED EMBODIMENTS

The herbicidal composition of the present invention can provide remarkable herbicidal effects against two or three-leaved barnyard grass weeds, which are only difficultly inhibited by conventional herbicides. The herbicidal composition can completely inhibit Slender or Needle spikerush, as well as annual paddy weeds and broad-leaved weeds including Barnyard grass, *Monochoria* and *Cyperus Serotinus* and it is capable of completely controlling the growth of the weeds, and especially those weeds which grow vigorously after germination.

Although it is not entirely understood, it is believed that unique effects are provided by the combination of the thiocarbamate and the 2,4-D, MCP in that a synergistic effect is obtained whereby the absorption of the 2,4-D, MCP by the stalk and leaves is increased and whereby the growth controlling effects of the thiocarbamate is enhanced.

The composition of this invention provides remarkably good herbicidal effects, even with reduced thiocarbamate quantities. No chemical injury to rice plants has been found, regardless of when the composition is applied following rice-transplantation. The fact that the composition of this invention can be applied after rice-transplantation, is not only economically advantageous, in that it reduces the amount of labor required, but is also provides the following additional advantages:

1. No chemical injury during the growth of the rice has been observed.
2. The growth controlling periods seemed to be prolonged.
3. The flowing out of the composition can be minimized by decrease of water-leak at that period.
4. The present composition can be used effectively in quite small amounts as a pre-emergence herbicide in the soil treatment of up-land fields.

Although the thiocarbamates alone are effective for controlling the growth of various weeds at the period of germination in up-land fields, and they are safe for use with farm product seeds, the effect of the thiocarbamates is not sufficient against broad-leaved weeds in up-land fields, as compared with the effect on paddy fields. Although 2,4-D or MCP is effective against various weeds at the time of germination, when used in small amounts 2,4-D or MCP has heretofore not been practically used on up-land fields. However, it has been found that the quantity of 2,4-D or MCP can synergistically be decreased by combining it with a thiocarbamate, as compared with the amount required when each ingredient is used separately.

The thiocarbamates used for this invention can be produced as follows:

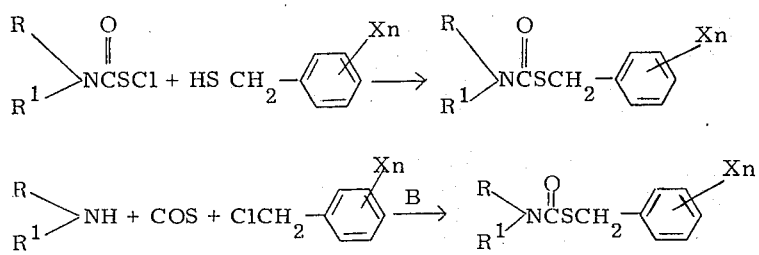

wherein R and R¹ represent alkyl group; and X represents chlorine or methyl group; and $n$ represents 1 or 2; and B represents bases.

Typical thiocarbamates include:
S(p-chlorobenzyl)-N,N-dimethylthiocarbamate bp. 40° – 42°C.
S(p-chlorobenzyl)-N,N-diethylthiocarbamate bp. 127° – 131°C./0.12 mmHg (referred to as CBDC)
S(o-chlorobenzyl)-N,N-diethylthiocarbamate bp. 136° – 140°C./0.04 – 0.05 mmHg
S(p-methylbenzyl)-N,N-diethylthiocarbamate bp. 107° – 115°C./0.002 mmHg (referred to as MBDC)
S(2,5-dichlorobenzyl)-N, N-dimethylthiocarbamate bp. 148° – 150°C./0.06 mmHg The salts of 2,4-dichlorophenoxy acetic acid or 2-methyl-4-chloroacetic acid include the alkali metal salts, such as sodium salts thereof and dimethylamine salt thereof. The esters of 2,4-dichlorophenoxy acetic acid or 2-methyl-4-chlorophenoxyacetic acid include the ethyl ester, isopropyl ester and allyl ester thereof. The preferable ratio of the ingredient is part by weight S(p-chlorobenzyl)-N,N-diethylthiocarbamate to 0.1 – 1.0 parts by weight 2,4-D or MCP.

It is preferable to apply the composition in granular form when applied to paddy fields. The granules are produced by mixing the active ingredients with an extender, such as bentonite, clay, talc or calcium carbonate; and a binder, such as sodium alkylbenzene sulfonate, polyvinyl alcohol, sodium lignin sulfonate; and by kneading the mixture with water, followed by granulating and drying. The granules can be also produced by adsorbing the active ingredients with or without being dissolved in a solvent such as dimethylformamide. An extender is then added such as granular kieselguhr, vermiculite, bentonite, talc, clay or calcium carbonate and a binder such as sodium alkylbenzene sulfonate, polyvinyl alcohol or sodium lignin sulfonate and the mixture is kneaded with water, granulated and dried.

The granules containing the active ingredients may be applied onto the fields by uniform scattering by hand or spray. It can be distributed by airplane or helicopter.

The composition of this invention can also be prepared in the form of a wettable powder, water miscible solution, emulsion or dust and can be applied with or without further dilution with water, and this form is most desirable when the composition is intended for up-land application. If necessary, the active ingredients can be mixed with other insecticides, fungicides or herbicides.

Having generally described the invention, a further understanding can be obtained by reference to certain specific Examples which are provided herein for purposes of illustration only and are not intended to be limiting in any manner. The percentages shown in the Examples are percentages by weight.

EXAMPLE 1 - GRANULE

5% of S-(p-chlorobenzyl)-N, N-diethylthiocarbamate (CBDC), 2.5% of 2,4-D isopropyl ester, 2% of sodium lignin sulfonate, 5% of white carbon and 85.5% of bentonite were crushed and mixed and admixed with a suitable amount of water, kneaded and granulated by an extrusion granulating machine. The granules were then dried and sifted using a 14–32 mesh sieve.

EXAMPLE 2 - GRANULE

5% of CBDC, 0.75% of 2,4-D allyl ester, 48% of bentonite, 44.75% of clay, 1% of sodium alkylbenzenesulfonate, 0.5% of polyvinyl alcohol were crushed and uniformly mixed, and a suitable amount of water was admixed. The granule was prepared in accordance with the process of Example 1.

EXAMPLE 3 - GRANULE

10% of S-(p-methylbenzyl)-N, N-diethylthiolcarbamate (MBDC), 5% of 2,4-D, 40% of calcium bicarbonate, 42% of clay, 1% of sodium alkylbenzenesulfonate, and 2% of sodium lignin sulfonate were mixed and the granule was prepared in accordance with the process of Example 1.

EXAMPLE 4 - GRANULE

10% of CBDC, 1% of 2,4-D, 40% of calcium bicarbonate, 45.5% of clay, 1.5% of sodium alkylbenzenesulfonate and 2% of sodium lignin sulfonate were crushed and mixed, and the granule was prepared in

EXAMPLE 5 - GRANULE

4% of CDBC, 2.5% of 2,4-D isopropyl ester, 41.5% of clay, 1.5% of calcium alkylbenzene sulfonate, 50% of bentonite, and 0.5% of polyvinyl alcohol were crushed and mixed, and the granule was prepared in accordance with the process of Example 1.

EXAMPLE 6 - GRANULE

5% of CBDC, 1.5% of 2,4-D ethylester, 50% of bentonite, 42% of clay, 1% of sodium alkylbenzenesulfonate and 0.5% of polyvinyl alcohol were crushed and uniformly mixed, kneaded with a suitable amount of water, and granulated by extrusion from a granulating machine. The granules were then dried and sifted using a 14 – 32 mesh sieve.

EXAMPLE 7 - GRANULE

5% of solution of 2,4-D allyl ester dissolved in 5 times its amount of hot dimethylformamide (weight ratio) and 5% of CBDC were uniformly adsorbed on 90% granule kieselguhr having 8 – 32 mesh grain size.

EXAMPLE 8 - POWDER

5% of CBDC, 1% of sodium 2,4-D, and 94% of mixture of kieselguhr and clay powder were crushed and mixed to yield a powder composition.

EXAMPLE 9 - GRANULE

5% of CBDC, 1.5% of sodium 2,4-D and 50% of bentonite, 40.5% of clay, 1% of sodium alkylacrylsulfonate and 2% of sodium lignin sulfonate were mixed, crushed, kneaded with a suitable amount of water and granulated by extrusion in a granulating machine (hole 1 mm.). The granules were then dried.

EXAMPLE 10 - WETTABLE POWDER

15% of MBDC, 2% of 2,4-D (sodium salt), 30% of clay, 50% of kieselguhr, 1% of polyoxyethylene alkylarylester and 2% of sodium lignin sulfonate were mixed and crushed to yield a wettable powder.

EXAMPLE 11 - GRANULE

5% of CBDC, 2.5% of potassium 2,4-D, 86.5% of a mixture of bentonite and talc, 4% of calcium lignin sulfonate as a dispersing agent and 2% of sodium alkylsulfate, were mixed and crushed. 85 parts of the mixture and 15 parts of water were kneaded and granulated in a granulating machine, dried and sifted.

EXAMPLE 12 - GRANULE

20% of bentonite, 10% of kieselguhr, 68% of clay and 2% of sodium lignin sulfonate were kneaded with water and granulated by extrusion from a granulating machine. The granules were then dried and sifted using a 8 – 32 mesh sieve. 7.5 parts of mixture and 2.5 parts of 2, 4-D isopropyl ester, and 5 parts of CBDC were adsorbed on 92.5 parts of the resultant granule.

EXAMPLE 13 - EMULSION

20% of CBDC, 10% of 2,4-D isopropylester, 15% of emulsifier and 55% of xylol were mixed, and diluted with water to yield an emulsion.

EXPERIMENT 1

(Test of growth control of barnyard weed, Slender or Needle spikerush, and broad-leaved weeds applied 7 days following rice-transplantation and chemical injury).

A wooden box of 800 cm$^2$ was filled with paddy soil mixed with the seeds of a barnyard weed and Monochoria. 6 plants of each of two rice seedlings having two leaves were transplanted at a depth of 2 cm. Seven days following transplantation, the herbicidal granule compositions were introduced into the box and water was poured to a depth of 2 cm. The results observed 2 weeks after the application were as follows:

TABLE 1

| Active Ingredient | Amount of Ingredient (g/10a) | Barnyard weed (pieces) | Slender spikerush (pieces) | Phytotoxicity |
|---|---|---|---|---|
| CBDC | 100 | 3 | 2 | none |
| 2,4-D ethylester | 15 | | | |
| CBDC | | | | |
| 2,4-D ethylester | 200 | 0 | 0 | none |
| | 10 | | | |
| MBDC | 100 | 2 | 0 | none |
| 2,4-D isopropyl-ester | 15 | | | |
| MBDC | 200 | 0 | 0 | none |
| 2,4-D isopropyl-ester | 10 | | | |
| MBDC | 100 | 3 | 1 | none |
| sodium 2,4-D | 20 | | | |
| MBDC | 200 | 0 | 0 | none |
| sodium 2,4-D | 15 | | | |
| CBDC (control) | 100 | 21 | 21 | none |
| CBDC (control) | 200 | 14 | 15 | none |
| MBDC (control) | 100 | 24 | 24 | none |
| MBDC (control) | 200 | 16 | 19 | none |
| 2,4-D ethylester (control) | 30 | 23 | 28 | *+ |
| " | 45 | 18 | 12 | *+ |
| 2,4-D isopropylester (control) | 30 | 24 | 28 | small |
| " | 45 | 14 | 11 | *+ |
| 2,4-D allylester (control) | 30 | 20 | 22 | small |
| " | 45 | 11 | 9 | *+ |
| sodium 2,4-D (control) | 30 | 23 | 26 | small |
| " | 45 | 17 | 12 | *+ |
| No treatment (control) | — | 33 | 38 | none |

(*+phytotoxicity is found)

EXPERIMENT 2

(Test of growth control of weeds in pot applied 10 days following rice-transplantation and chemical injury of rice seedling.)

A wooden box of 800 cm$^2$ was filled with a paddy soil containing seeds of barnyard weed and Monochoria, 6 plants of each of two rice seedlings having three leaves (Kinnanpu Type rice seedlings) were transplanted to a depth of 2 cm. Ten days following transplantation, the herbicidal composition dissolved in 10 ml. of water was applied dropwise to the box and water was poured to a depth of 2 cm. The results observed after three weeks from the application were as follows:

TABLE 2

| Active Ingredient | Amount of Ingredient (g/10a) | Barnyard weed (pieces) | Slender spikerush (pieces) | Monochoria (pieces) | phytotoxicity |
|---|---|---|---|---|---|
| CBDC (control) | 100 | 21 | 21 | 19 | none |
| CBDC (control) | 200 | 13 | 3 | 16 | none |
| MBDC (control) | 100 | 22 | 28 | 18 | none |
| MBDC (control) | 200 | 13 | 15 | 14 | none |
| CBDC | 100 | 5 | 6 | 2 | none |
| 2,4-D ethylester | 30 | | | | |
| CBDC | 150 | 1 | 0 | 0 | none |
| 2,4-D ethylester | 20 | | | | |
| CBDC | 100 | 3 | 4 | 3 | none |
| 2,4-D isopropyl ester | 30 | | | | |
| CBDC | 100 | 1 | 0 | 0 | none |
| 2,4-D isopropyl ester | 50 | | | | |
| CBDC | 150 | 0 | 0 | 0 | none |
| 2,4-D isopropyl-ester | 20 | | | | |
| CBDC | 100 | 4 | 8 | 2 | none |
| 2,4-D allylester | 30 | | | | |
| CBDC | 150 | 2 | 0 | 0 | none |
| 2,4-D allylester | 20 | | | | |
| MBDC | 100 | | | | |
| sodium 2,4-D | 30 | 3 | 8 | 2 | none |
| MBDC | 150 | 1 | 2 | 0 | none |
| sodium 2,4-D | 20 | | | | |
| 2,4-D isopropyl-ester (control) | 20 | 22 | 34 | 11 | *+ |
| 2,4-D isopropyl-ester (control) | 40 | 18 | 26 | 4 | *++ |
| No treatment (control) | — | 28 | 46 | 19 | none |

(*+phytotoxicity is found)
(++fair phytotoxicity is found)

EXPERIMENT 3 - PADDY FIELD (Test of growth control of weeds on paddy field.)

The paddy field was divided into 5 m² per block and rice seedlings (Kinnanpu Type rice seedlings) were transplanted on June 15. The paddy field contained barnyard weeds having 2.5 – 3 leaves, Slender spikerush and broad-leaved weeds. Fifteen days following rice-transplantation, the herbicidal composition granules were applied by hand. The results were observed on July 10, measuring the amount of weed growth per 1 m². The amount of chemical injury was observed at that time. The results were as follows:

TABLE 3

| Active Ingredient | Amount ingredient (g/10a) | Weeds (pieces) *A | *B | *C | Slender spikerush weight (g) | phytotoxicity |
|---|---|---|---|---|---|---|
| CBDC (5%) 2,4-D ethylester (2.5%) | 2 | 1 | 1 | 0 | 10 | none |
| " | 4 | 0 | 0 | 0 | 0 | none |
| CBDC (5%) 2,4-D isopropyl-ester (2.5%) | 1.5 | 0 | 0 | 0 | 0 | none |
| " | 3 | 0 | 0 | 0 | 0 | none |
| CBDC (5%) 2,4-D isopropyl-ester (1%) | 2 | 1 | 1 | 0 | 0 | none |
| " | 4 | 0 | 0 | 0 | 0 | none |
| MBDC (5%) 2,4-D ethylester (1%) | 2 | 1 | 1 | 0 | 0 | none |
| " | 4 | 0 | 0 | 0 | 0 | none |
| MBDC (5%) 2,4-D isopropyl-ester (2.5%) | 2 | 1 | 0 | 0 | 0 | none |
| " | 4 | 0 | 0 | 0 | 0 | none |
| DBDC (10%) (control) | 2 | 18 | 2 | 0 | 0 | none |
| " | 4 | 9 | 0 | 1 | 0 | none |
| MBDC (10%) (control) | 2 | 17 | 34 | 16 | 560 | none |
| " | 4 | 10 | 28 | 15 | 320 | none |
| 2,4-D ethylester (3%) (control) | 3 | 25 | 35 | 13 | 640 | + |
| " | 4 | 20 | 29 | 8 | 470 | ++ |
| 2,4-D isopropyl-ester (3%) (control) | 3 | 23 | 29 | 19 | 570 | + |
| " | 4 | 18 | 20 | 7 | 412 | ++ |
| NIP granule (7%) (control) | 3 | 24 | 38 | 16 | 715 | none |
| " | 4 | 13 | 36 | 11 | 520 | + |
| No treatment | — | 29 | 46 | 18 | 816 | none |

+phytotoxicity is found
++fairly phytotoxicity is found
*A:Barnyard weed
*B:Slender spikerush
*C:Monochoria

EXPERIMENT 4

A pot of 200 cm² was filled with soil and 5 seeds of soybean, wheat, rice and radish were placed into it. The soil contained seeds of large crab grass, barnyard and Smartweed. Emulsions containing 2,4-D isopropylester and/or CBDC were diluted with water at the rate of 100 l per 10 Ares and were sprayed into the pot. After this application, each pot was kept in a hothouse. After two weeks, the growth of each of the plants were observed. The results are shown in Table 4, wherein the amount of active ingredient is shown as weight of ingredient per 10 Ares. The herbicidal effects are shown using the following standards:

0 : complete growth
1 : slight inhibition
2 : visible inhibition
3 : medium inhibition
4 : remarkable inhibition
5 : no growth

TABLE 4

| Active Ingredient and Amount | | *D | *E | *F | *G | *H | *I | *J |
|---|---|---|---|---|---|---|---|---|
| 2,4-D | | | | | | | | |
| 12.5 g | | 0 | 0 | 0 | 0 | 0 | 0 | 0 |
| 25 g | | 2 | 1 | 3 | 1 | 1 | 0 | 3 |
| 50 g | | 4 | 3 | 5 | 2 | 2 | 2 | 4 |
| 100 g | | 5 | 4 | 5 | 3 | 4 | 3 | 5 |
| 200 g | | 5 | 5 | 5 | 5 | 4 | 4 | 5 |
| CBDC | | | | | | | | |
| 25 g | | 0 | 0 | 0 | 0 | 0 | 0 | 0 |
| 50 g | | 3 | 2 | 1 | 0 | 0 | 0 | 0 |
| 100 g | | 5 | 4 | 2 | 0 | 0 | 0 | 1 |
| 200 g | | 5 | 5 | 3 | 1 | 1 | 0 | 2 |
| 400 g | | 5 | 5 | 4 | 3 | 3 | 0 | 3 |
| 2,4-D +CBDC | | | | | | | | |
| 12.5 g | 25 g | 2 | 0 | 2 | 0 | 0 | 0 | 1 |
| 12.5 g | 50 g | 4 | 3 | 3 | 0 | 0 | 0 | 2 |
| 12.5 g | 100 g | 5 | 4 | 5 | 0 | 0 | 0 | 3 |
| 2,4-D+CBDC | | | | | | | | |
| 25 g | 25 g | 3 | 3 | 4 | 0 | 0 | 0 | 2 |
| 25 g | 50 g | 5 | 5 | 5 | 0 | 1 | 0 | 3 |
| 25 g | 100 g | 5 | 5 | 5 | 0 | 2 | 0 | 5 |
| 2,4-D + CBDC | | | | | | | | |
| 50 g | 25 g | 4 | 5 | 5 | 0 | 0 | 0 | 4 |
| 50 g | 50 g | 5 | 5 | 5 | 1 | 2 | 0 | 4 |
| 50 g | 100 g | 5 | 5 | 5 | 1 | 3 | 2 | 5 |
| No treatment | | 0 | 0 | 0 | 0 | 0 | 0 | 0 |

*D: Large crab grass
*E: barnyard
*F: Smartweed
*G: soybean
*H: wheat
*I: rice
*J: radish

EXPERIMENT 5

(Test of synergistic effect of 2,4-D and DBDC on field.)

After sowing soybean seeds on the field, the field was divided into 10 m² per block. 2,4-D isopropylester emulsion, CDCD emulsion and the emulsion mixture stated in Example 13 were respectively sprayed using a hand sprayer after dilution, at the rate of 100 per 10 Ares. One month following the application, the number and weight of each of the weeds, Mannagrass, Chufa, Barnyard grass, Common purslane in 2 m² to each central part were measured. Any chemical injury to the soybean was observed. The results are shown in Table 5, wherein the amount of ingredient is the weight of ingredient per 10 Ares.

TABLE 5

| Active Ingredient Amount | *K Pieces | Weight | *L Pieces | Weight | *M Pieces | Weight | *N Pieces | Weight | Soybean phytotoxicity |
|---|---|---|---|---|---|---|---|---|---|
| 2,4-D | | | | | | | | | |
| 12.5 g | 273 | 503 | 568 | 235 | 43 | 52 | 106 | 251 | none |
| 25 g | 165 | 338 | 289 | 106 | 12 | 17 | 59 | 135 | none |
| 50 g | 83 | 81 | 78 | 27 | 10 | 12 | 18 | 23 | + |
| 100 g | 48 | 22 | 15 | 3 | 2 | 1 | 4 | 8 | + |
| 200 g | 15 | 8 | 4 | 1 | 0 | 0 | 0 | 0 | +++ |
| CBDC | | | | | | | | | |
| 25 g | 285 | 493 | 524 | 221 | 26 | 32 | 85 | 215 | none |
| 50 g | 256 | 502 | 333 | 106 | 27 | 38 | 67 | 186 | none |
| 100 g | 210 | 52 | 125 | 34 | 18 | 31 | 72 | 162 | none |
| 200 g | 34 | 4 | 58 | 12 | 20 | 18 | 18 | 58 | + |
| 400 g | 0 | 0 | 0 | 1 | 11 | 15 | 21 | 47 | ++ |
| 2,4-D + CBDC | | | | | | | | | |
| 12.5 g + 25 g | 86 | 64 | 101 | 32 | 15 | 18 | 23 | 45 | none |
| 25 g + 50 g | 23 | 12 | 36 | 13 | 15 | 6 | 12 | 19 | none |
| 50 g + 100 g | 0 | 0 | 5 | — | 3 | 1 | 2 | — | none |
| 100 g + 200 g | 0 | 0 | 0 | 0 | 0 | 0 | 0 | 0 | + |
| No treatment | 252 | 554 | 635 | 240 | 35 | 45 | 98 | 263 | none |

*K Large crab-grass
*L Chufa
*M Barnyard grass
+ chemical injury is found
++ fairly chemical injury is found
+++ remarkable chemical injury is found

EXPERIMENT 6

(Test of growth control of barnyard weed, Slender or Needle spikerush, and broad-leaved weeds applied 7 days following rice-transplantation and chemical injury.)

A wooden box of 800 cm² was filled with paddy soil mixed with the seeds of a barnyard weed and Monochoria. 6 plants of each of two rice seedlings having two leaves were transplanted at a depth of 2 cm. Seven days following transplantation, the herbicidal granule compositions were introduced into the box and water was poured to a depth of 2 cm. The results observed after 2 weeks from the application were as follows:

TABLE 6

| Active Ingredient | Amount of Ingredient (g/10a) | Barnyard weed (pieces) | Slender spike-rush (pieces) | phyto-toxi-city |
|---|---|---|---|---|
| CBDC | 50 | 8 | 5 | None |
| MCPethylester | 100 | | | |
| CBDC | 100 | 3 | 2 | None |
| MCPethylester | 15 | | | |
| CBDC | 200 | 0 | 0 | None |
| MCPethylester | 10 | | | |
| CBDC | 100 | 4 | 3 | None |
| MCPallylester | 15 | | | |
| CBDC | 200 | 1 | 0 | None |
| MCPallylester | 10 | | | |
| MBDC | 100 | 4 | 1 | None |
| MCPethylester | 15 | | | |
| MBDC | 200 | 0 | 0 | None |
| MCPethylester | 10 | | | |
| MBDC | 100 | 3 | 1 | None |
| MCPallylester | 20 | | | |
| MBDC | 200 | 1 | 0 | None |
| MCPallylester | 15 | | | |
| CBDC (control) | 100 | 21 | 21 | None |
| CBDC (control) | 200 | 14 | 15 | None |
| CBDC (control) | 400 | 6 | 6 | None |
| MBDC (control) | 100 | 24 | 24 | None |
| MBDC (control) | 200 | 16 | 19 | None |
| MBDC (control) | 400 | 8 | 9 | None |
| MCP ethylester (control) | 30 | 24 | 24 | + |
| MCP ethylester (control) | 60 | 8 | 4 | ++ |
| MCP allylester (control) | 30 | 21 | 18 | + |
| MCP allylester (control) | 60 | 6 | 4 | ++ |
| No treatment (control) | — | 33 | 38 | None |

+ phytotoxicity is found
++ Fair phytotoxicity is found

EXPERIMENT 7 - (PADDY FIELD)

(Test of synergistic effect of growth control of therophyte and perennial weeds on paddy field and phytotoxicity to rice.)

A paddy field was divided into 5 cm² per block and rice seedlings (Kinmaze Type rice seedlings) were transplanted on June 15. The paddy field contained barnyard weeds, Monochoria, *Cyperus serotinus* and Slender spikerush.

Twelve days following rice-transplantation, the herbicidal compositions were applied by hand. The results were observed after 3 weeks by measuring the amount of weed growth per 1 m² and are shown in Table 7. The data in row 6 of Table 7 is comparative data relating to the herbicidal composition of Kimura et al (U.S. Pat. No. 3,682,616).

TABLE 7

| Active Ingredient | Amount of Ingredient (kg/10a) | Barnyard (pieces) | Weeds Monochoria (pieces) | Cyperus (pieces) | Slender Spike-rush (g) | Phytotox-icity |
|---|---|---|---|---|---|---|
| CBDC (5%) + MCPE (1.0%) | 2 | 2 | 0 | 2 | 1.3 | none |
| | 4 | 0 | 0 | 0 | 1.0 | none |
| CBDC (5%) + MCPA (1.0%) | 2 | 4 | 0 | 2 | 1.2 | none |
| | 4 | 0 | 0 | 0 | 1.0 | none |
| CBDC (10%) | 2 | 24 | 38 | 45 | 68.7 | none |
| | 4 | 18 | 29 | 38 | 53.9 | none |
| MCPE (1.5%) | 2 | 26 | 43 | 48 | 77.9 | slight |
| | 4 | 26 | 40 | 46 | 76.9 | severe |
| MCPA (1.5%) | 2 | 27 | 41 | 46 | 78.1 | slight |
| | 4 | 24 | 41 | 43 | 77.7 | severe |
| CBDC (5%) + Cymetrine (1.0%) | 2 | 9 | 10 | 24 | 3.8 | none |
| | 4 | 4 | 3 | 10 | 1.3 | none |
| Pamcon (PCP 13.4% + MCPA 1.2%) | 2 | 25 | 40 | 47 | 76.5 | slight |
| | 4 | 23 | 40 | 46 | 76.1 | none |
| Non-treatment | — | 27 | 43 | 48 | 123.1 | none |

CBDC:S-(4-chlorobenzyl)-N,N-diethylthiolcarbamate
MCPE:Ethyl 2-methyl-4-chlorophenoxyacetate
MCPA:Allyl 2-methyl-4-chlorophenoxyacetate
PCP:Sodium pentachlorophenolate

EXPERIMENT 8

(Test of synergistic effect)

After sowing soybean seeds onto a field, the field was divided into 10 m² per block. 2,4-D isopropyl ester emulsion, MCP-ethyl ester emulsion, CBDC emulsion, a mixed emulsion of Cymetrine and CBDC and emulsions of our invention were respectively sprayed using a hand spray after dilution, at the rate of 100 liter per 10 Ares.

Twenty days following the application, the number of each of the weeds, Smartweed, Chufa, and Common purslane in a 2 m² central portion of each block were measured and the phytotoxicity of the soybeans was observed. The data is shown in Table 8 along with comparative data in row 6 which relates to the herbicidal composition of Kimura et al (U.S. Pat. No. 3,682,616).

TABLE 8

| Active Ingredient (g/10 a) | Smart-weed (piece) | Weeds Chufa (pieces) | Common purslane (pieces) | Phyto-toxicity |
|---|---|---|---|---|
| 2,4-D isopropyl ester | | | | |
| 50 g | 21 | 84 | 24 | slight |
| 100 g | 9 | 21 | 9 | slight |
| MCP-ethyl ester | | | | |
| 50 g | 28 | 71 | 26 | negligible |
| 100 g | 13 | 18 | 11 | slight |
| CBDC | | | | |
| 100 g | 48 | 132 | 76 | none |
| 200 g | 32 | 62 | 21 | negligible |
| 2,4-D isopropyl ester +CBDC | | | | |
| 50 g + 100 g | 0 | 2 | 1 | none |
| 100 g + 200 g | 0 | 0 | 0 | none |
| MCP-ethyl ester + CBDC | | | | |
| 50 g + 100 g | 0 | 3 | 0 | none |
| 100 g + 200 g | 0 | 0 | 0 | none |
| Cymetrine + CBDC | | | | |
| 50 g + 100 g | 26 | 98 | 76 | none |
| 100 g + 200 g | 12 | 31 | 43 | none |
| Non-treatment | 69 | 605 | 102 | none |

Having now fully described the invention, it will be apparent to one of ordinary skill in the art that many changes and modification can be made thereto, without departing from the spirit and scope of the invention.

What is claimed as new and intended to be covered by Letters Patent is:

1. A herbicidal composition consisting essentially of an effective amount of the mixture of 1 part by weight S-(monochloro, dichloro or methylbenzyl) N,N-diloweralkyl-thiocarbamate and 0.1 – 1.0 parts by weight of 2,4-dichlorophenoxy acetic acid or 2-methyl-4-chlorophenoxyacetic acid or the lower aliphatic hydrocarbyl esters or alkali metal salts thereof as active ingredients.

2. The herbicidal composition according to claim 1, wherein said thiocarbamate is S-(p-chlorobenzyl)-N,N-diethylthiocarbamate or S-(o-chlorobenzyl)-N,N-diethylthiocarbamate, and said phenoxy acetic acid or ester or salt thereof is the propylester, allylester, ethylester, sodium salt or potassium salt of 2,4-dichlorophenoxy acetic acid or 2-methyl-4-chlorophenoxyacetic acid.

3. The herbicidal composition according to claim 1 which is in granular form in combination with an inert extender and a binder.

4. The herbicidal composition according to claim 1 which is in the form of a water miscible solution.

5. The herbicidal composition according to claim 1 which is in the form of an emulsion.

6. The herbicidal composition according to claim 1 which is in the form of a powder.

7. A method for controlling the growth of weeds, which comprises:
   treating an area of plant growth with an effective amount of a mixture of 1 part by weight S-(monochloro, dichloro- or methylbenzyl)N,N-diloweralkylthio-carbamate and 0.1 – 1.0 parts by weight of 2,4-dichlorophenoxy acetic acid or 2-methyl-4-chlorophenoxyacetic acid or the lower aliphatic hydrocarbyl esters or alkali metal salts thereof as active ingredients.

8. The method of claim 7, wherein said mixture is applied in granular form.

9. The method of claim 8, wherein said granules comprise in addition to said active ingredients an inert extender and a binder.

10. The method of claim 7, wherein said mixture is applied as a wettable powder, a water miscible solution, emulsion or dust.

* * * * *